Sept. 1, 1936.    B. W. FREEMAN    2,052,759
CUTTING DIE
Filed June 27, 1935
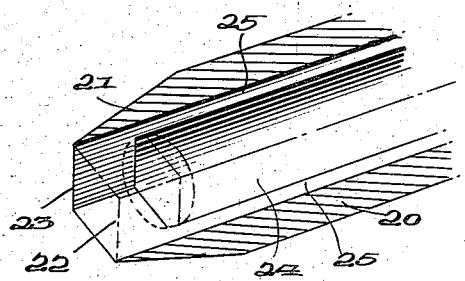
Fig. 1.
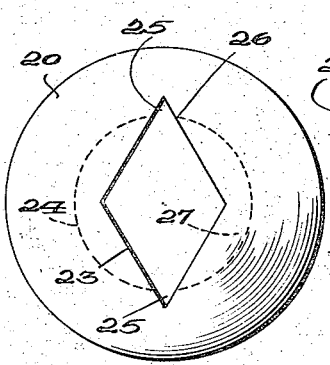    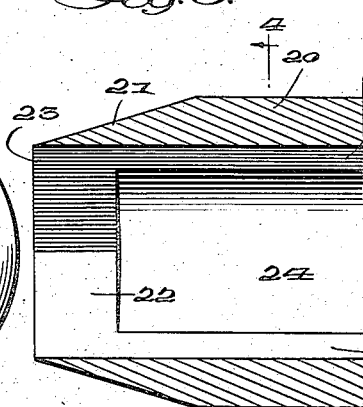    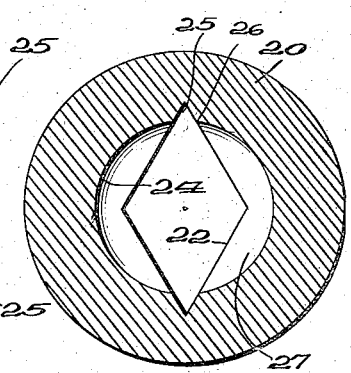
Fig. 2.    Fig. 3.    Fig. 4.
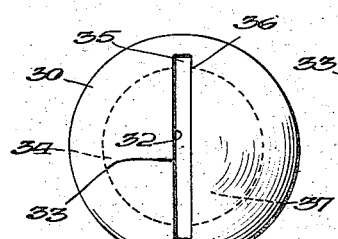    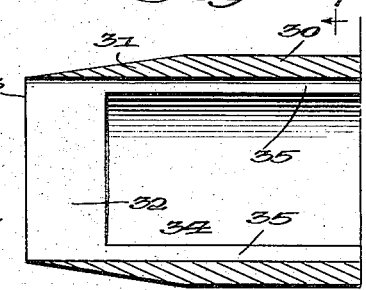    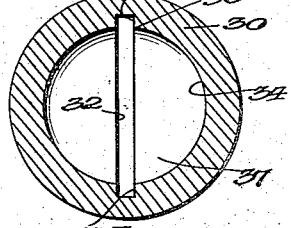
Fig. 5.    Fig. 6.    Fig. 7.
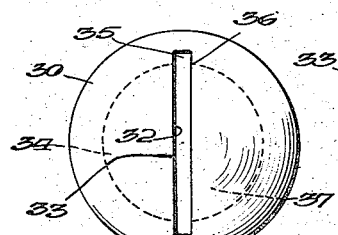    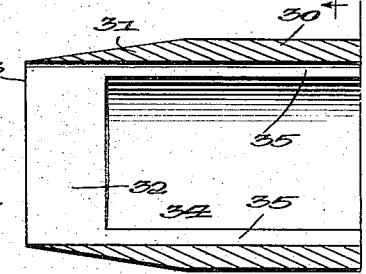    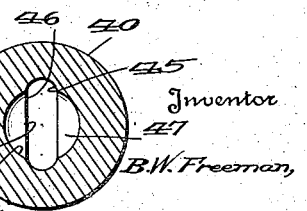
Fig. 8.    Fig. 9.    Fig. 10.
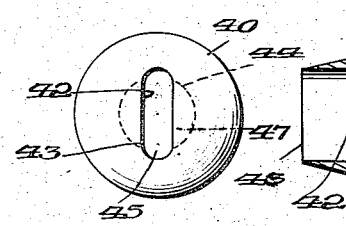
Inventor
B. W. Freeman,
By Riordan & Riordan
Attorneys Patented Sept. 1, 1936

2,052,759

UNITED STATES PATENT OFFICE 2,052,759

CUTTING DIE

Benjamin W. Freeman, Cincinnati, Ohio

Application June 27, 1935, Serial No. 28,726

19 Claims. (Cl. 164—33)

The present invention relates to ornamenting, cut-out and perforating dies, and more particularly to the construction of perforating, cutting and punching tubes used in such dies.

Ornamenting dies of this general nature utilize a number of hollow tubes for punching out ornamental patterns in a piece of work, and the tubes for effecting the individual perforations may be quite small.

Tubes for cutting or punching round holes are well known and comparatively simple to manufacture, as the tube is merely drilled to provide a cylindrical opening through the shank, conforming to the circumference of the cutting edges, and these tubes offer no material difficulties when in use, but a great deal of trouble is experienced with tubes where the cut is not round, due to the fact that the cuttings, or chips cut out of the work, clog in the shank of the tube. When this occurs, and it may occur after punching very few pieces of work, the operator has to stop, and force the cuttings through the tubes, with a small instrument. This objection applies to a great many different, and irregular shapes especially in the cutters of elongated holes.

Making these tubes with the hollow interior or passageway from the cutting edge to the shank end of the tube, of a shape conforming to the cutting edge, by broaching or in any other manner, is too expensive an operation.

Efforts have been made in the past to overcome the difficulty of clogging, and it has been a customary practice to form a round hole in the shank of the tube, back of the cutting portion, of an internal diameter approximating the greatest dimension of the cutout, and therefore of a size sufficiently large to allow the chips or cuttings to pass through.

This is unsatisfactory, however, as the chips will tend to twist, turn or get out of alignment, as soon as they pass beyond the shaped cutting portion.

It is accordingly an object and feature of the present invention to provide, in tubes of different and irregular shapes, means permitting the cuttings to pass through the shank, one on top of the other, without twisting, turning or getting out of alignment.

It is another object to construct a tube in this manner by a simple drilling and broaching operation, wherein the shank opening or passageway is generally cylindrical in shape, but which will still hold the chips in alignment as they pass through the tube and prevent clogging.

To this end a guideway or key-way is provided for engagement with a small portion of each chip, providing at the same time sufficient frictional contact between the chips and the interior walls of the tubes, to permit a free passage of the cuttings or chips without jamming and maintaining them in alignment as they pass through the tube.

A further feature is to provide a simple, inexpensive construction which is however applicable to all types of fancy shaped tubes, whereby such fancy shaped tubes may be utilized in operation for punching an indefinite amount of work, without requiring the operator to stop and clean or force the cuttings out of the tubes, or to replace broken tubes, thereby avoiding delays in operation.

To the attainment of the above and other objects which will appear as the description proceeds, reference may be made to the accompanying drawing, in which:—

Fig. 1 is a phantom perspective, in section, of a tube embodying the invention;

Fig. 2 is an end elevation of a tube showing one shape of cutter;

Fig. 3 is a section thereof;

Fig. 4 is a section on the line 4—4 of Fig. 3;

Fig. 5 is an end elevation of a tube showing a different shape of cutter;

Fig. 6 is a section thereof;

Fig. 7 is a section on the line 7—7 of Fig. 6;

Fig. 8 is an end elevation of a tube showing a still different shape of cutter;

Fig. 9 is a section thereof; and

Fig. 10 is a section on the line 10—10 of Fig. 9.

Referring now to the drawing in which like reference numerals designate like parts, it will be observed that while three different cutters have been illustrated, there is no modification in the invention therebetween, and it is contemplated that the invention may be applied to any conceivable, irregular shape.

Considering first, Figs. 1 to 4, there is disclosed a cutting or perforating tube having a hollow cylindrical body or shank 20 which merges or tapers at 21 to form a cutter portion 22, terminating in cutting edges 23, arranged in diamond shape. The interior of the cutter portion 22 is diamond shaped to conform to the edges 23. The remainder or shank portion of the tube is drilled to form an internal cylindrical passageway, the diameter of which is somewhat less than the greatest dimension of the opening in the cutter portion. Slots or keyways 25—25 are formed throughout the entire length of the shank, and extend radially outwardly from the wall of passageway 24, to form shoulders 26, the slots being shaped and located to correspond to the extremities of the major dimension of the cutter portion, in the present example the points of the diamond, and these keyways or slots, conforming to the shape of those portions of the cutter opening which extend beyond the cylindrical or drilled walls, will function readily to guide any chips entering the interior of the tube.

The cutter in Figs. 5, 6 and 7 is of an elongated rectangular configuration, is provided with a hollow cylindrical body or shank 30 tapering at 31 to the cutter portion 32, having cutting edges 33, and is similarly drilled to form the hollow interior 34 of the shank, the guideways 35—35 being provided beyond the point 36, and being of the shape of the ends of the cutter opening.

In Figs. 8, 9 and 10 is illustrated a tube designed to produce an elongated, oval hole, this tube having the shank 40, tapering at 41 to the cutter portion 42, having cutting edges 43, and is similarly drilled to form the hollow interior or passageway 44 of the shank, the guideways 45—45 likewise being provided beyond the point 46 of the passage wall and being of the shape of the ends of the cutter opening.

While in the illustrated embodiments it so happens that there are but two keyways and these are disposed opposite each other, it will be obvious that irregular shapes in which keyways disposed in other than diametrically disposed relation might be presented, for example if the cutter were of a five-pointed star shape, there would be no need for oppositely disposed keyways, and it might be desirable to provide three or more keyways; hence it is not intended that the foregoing description shall be limiting, being merely illustrative.

In operation the chips will pass from the cutting edges to the open end of the shank without twisting, turning or disalignment, being guided by the keyway. It is unnecessary in a construction of this sort to enlarge or taper the interior walls of the tube outwardly toward the base of the shank for purposes of relieving the chips, as such relief is well afforded by the clearance indicated at 27, 37 or 47, between the edges of the chip and the cylindrical walls of the passageways 24, 34 or 44.

It will thus be seen that great advantages are afforded, not only to an operator, who is saved the need of stopping operations to clean or replace the tubes, and the various other objections attendant upon an improperly operating tool, but also to the manufacturers of dies who are enabled to produce a more satisfactory structure at a reasonable cost, and ease of production, but with no limitation as to shape of cutter.

Having thus described my invention, what I claim as new and desire to secure by Letters Patent, is:

1. A cutting tube for ornamenting dies, comprising a cutter portion provided with cutting means, a hollow shank portion extending therefrom to receive and discharge cuttings, the hollow interior of said shank portion being enlarged and shaped at determined points to guide the cuttings during their passage from the cutting portion, through the shank.

2. A cutting tube for ornamenting dies, comprising a cutter portion provided with cutting means, a hollow shank portion extending therefrom to receive and discharge cuttings, the hollow interior of said shank portion being enlarged and shaped at determined points to maintain the cuttings in alignment during their passage from the cutting portion, through the shank.

3. A cutting tube for ornamenting dies, comprising a cutter portion provided with cutting means, a hollow shank portion extending therefrom to receive and discharge cuttings, the hollow interior of said shank portion being enlarged and shaped at determined points to hold the cuttings in predetermined relation during their passage from the cutting portion, through the shank.

4. A cutting tube for ornamenting dies, comprising a hollow shank portion of generally cylindrical internal configuration and a cutting portion of a different internal configuration, at least one dimension of which is greater than the internal diameter of the shank, and said shank having an internal portion shaped and dimensioned to correspond to the greatest dimension of said cutting portion.

5. A cutting tube for ornamenting dies, comprising a hollow shank portion of generally cylindrical internal configuration and a cutting portion of a different internal configuration, at least one dimension of which is greater than the internal diameter of the shank, and said shank being internally slotted to provide an internal portion shaped and dimensioned to correspond to the greatest dimension of said cutting portion.

6. A cutting tube for ornamenting dies comprising a hollow cutting portion of one shape and a shank having a hollow interior of a different shape, said shank being provided with guideways for cuttings entering its hollow interior.

7. A perforating tube for ornamenting dies having a hollow shank terminating in cutting edges at one end and provided with guideways for the cuttings entering and passing through said shank.

8. A perforating tube for ornamenting dies comprising a hollow shank terminating at one end in a non-circular cutter, said shank being formed with a substantially cylindrical passageway for cuttings entering the shank from the cutter, and being slotted to provide a guideway for maintaining said cuttings in alignment during their passage through the shank.

9. A perforating tube for ornamenting dies comprising a hollow shank terminating at one end in a non-circular cutter, said shank being formed with a substantially cylindrical passageway of lesser diameter than the greatest internal dimension of said cutter to receive cuttings entering the shank from the cutter, and being slotted to provide a guideway of a dimension coextensive with the greatest dimension of said cutter and aligned therewith, for maintaining said cuttings in alignment during their passage through the shank.

10. A perforating tube for ornamenting dies having a hollow cutter of one internal configuration and a hollow shank of a different internal configuration, said shank being internally shaped to insure passage of the cuttings therethrough without twisting, turning or getting out of alignment.

11. A perforating tube for ornamenting dies having a hollow cutter of non-circular configuration at one end, and a drilled shank shaped to receive cuttings from the cutter and to hold them in alignment as they pass therethrough from the cutter.

12. A perforating tube for ornamenting dies having a hollow shank portion terminating in an elongated hollow cutting portion, said shank being internally recessed, from the ends of the cutting portion, throughout the length of the hollow shank portion, to provide a guide for cuttings entering and passing through said shank portion.

13. A cutting tube for ornamenting dies comprising a cutter portion provided with cutting means, a shank portion extending therefrom and formed with a substantially axial opening therethrough to receive and discharge cuttings, and means additional to said opening to guide the cuttings during their passage from the cutting portion through the shank.

14. A cutting tube for ornamenting dies comprising a cutter portion provided with cutting means, a shank portion extending therefrom and formed with a substantially axial opening therethrough to receive and discharge cuttings, and means additional to said opening to maintain the cuttings in alignment during their passage from the cutting portion through the shank.

15. A cutting tube for ornamenting dies comprising a cutter portion provided with cutting means, a shank portion extending therefrom and formed with a substantially axial opening therethrough to receive and discharge cuttings, and means additional to said opening to hold the cuttings in predetermined relation during their passage from the cutting portion through the shank.

16. A cutting tube for ornamenting dies comprising a hollow cutting portion of one cross sectional shape and a hollow shank of a different cross sectional shape, said shank being formed with internal guideways for cuttings entering its hollow interior.

17. A cutting tube for ornamenting dies comprising a cutter portion provided with cutting means, a hollow shank portion extending therefrom to receive and discharge cuttings, the internal wall of said hollow shank portion being grooved to form a means to guide the cuttings during their passage from the cutting portion through the shank.

18. A cutting tube for ornamenting dies comprising a cutter portion provided with cutting means, a hollow shank portion extending therefrom to receive and discharge cuttings, the internal wall of said hollow shank portion being grooved to form a means to maintain the cuttings in alignment during their passage from the cutting portion, through the shank.

19. A cutting tube for ornamenting dies comprising a cutter portion provided with cutting means, a hollow shank portion extending therefrom to receive and discharge cuttings, the internal wall of said hollow shank portion being grooved to form a means to hold the cuttings in predetermined relation during their passage from the cutting portion through the shank.

BENJAMIN W. FREEMAN.